United States Patent Office 3,402,176
Patented Sept. 17, 1968

3,402,176
O-PYRAZOLO-(1,5-a)-PYRIMIDYL PHOS-
PHORUS-CONTAINING ESTERS
Hans-Gerd Schicke, Wuppertal-Elberfeld, Germany, assignor to Farbenfabriken Bayer Aktiengesellschaft, Leverkusen, Germany, a corporation of Germany
No Drawing. Filed Dec. 20, 1965, Ser. No. 515,181
Claims priority, application Germany, Dec. 24, 1964,
F 44,813
10 Claims. (Cl. 260—256.4)

ABSTRACT OF THE DISCLOSURE

O - pyrazolo-(1,5-a)-pyrimidyl-phosphorus acid esters which possess biocidal, especially pesticidal, properties and which may be produced by conventional methods.

---

The present invention relates to particular new phosphorus-containing esters, to their compositions with dispersible carrier vehicles, as well as to processes for the preparation and use thereof.

It is an object of the present invention to provide particular new O-pyrazolo-(1,5-a)-pyrimidyl-phosphorus acid esters which possess valuable biocidal, especially pesticidal, properties, to provide active compositions in the form of mixtures of such compounds with liquid and solid dispersible carrier vehicles, to provide processes for producing such compounds, and to provide methods of using such compounds in a new way, especially for combatting pests, such as insects, and the like.

Other and further objects of the present invention will become apparent from a study of the within specification and accompanying examples.

I thas been found in accordance with the present invention that the particular new O-pyrazolo-(1,5-a)-pyrimidyl-phosphorus acid esters having the general formula:

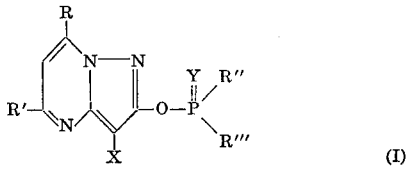

(I)

in which R and R' each respectively is selected from the group consisting of hydrogen and alkyl having 1 to 3 carbon atoms, R" and R'" each respectively is selected from the group consisting of alkyl, alkoxy and phenyl, X is selected from the group consisting of hydrogen and halogen, and Y is selected from the group consisting of oxygen and sulfur, possess markedly pronounced biocidal, e.g., pesticidal, properties.

Advantageously, it has been further found in accordance with the present invention that the particular new compounds of general Formula I above can be produced in a smooth reaction and with very good yields by the process which comprises reacting, in the presence of an acid-binding agent, an acid halide having the general formula:

(IIa)

in which R", R'" and Y are the same as defined above and Hal. is a halogen atom, preferably a chlorine atom, with pyrazolo-(1,5-a)-pyrimidines, having the general formula:

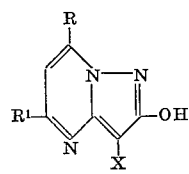

(IIb)

in which R, R' and X are the same as defined above.

The instant process is preferably carried out in the presence of inert organic solvents, such as aliphatic ketones, for example, acetone, methyl ethyl ketone, methyl isopropyl ketone, methyl isobutyl ketones, and the like, as well as nitriles, for example, acetonitrile, propionitrile, and the like, and also hydrocarbons, for example, benzene, toluene, xylene, and the like.

The reaction is advantageously carried out at temperatures substantially between about 20° C. and the boiling point of the reaction mixture, preferably at substantially between about 25 to 60° C. To obtain good yields and pure products, it has been found advantageous to stir the reaction mixture, after combination of the starting components, for a prolonged period of time, i.e., 1 to 3 hours, while heating to the aforesaid temperature.

As acid-binding agents, it is preferred to use alkali metal alcoholates or carbonates, such as sodium or potassium methylate, ethylate, etc., carbonate, and the like, as well as tertiary amines, such as pyridine, triethylamine or diethylaniline, and the like.

Instead of working in the presence of acid-binding agents, it is also possible to start from the salts, preferably the alkali metal or ammonium salts, of the above-mentioned pyrazolo-(1,5-a)-pyrimidines and to react these with the appropriate acid halides.

The pyrazolo-(1,5-a)-pyrimidines required as starting materials are known from the literature and can be prepared by the process described, for example, by W. Ried and E. U. Kecher (Annalen, 647, 116/1961).

Some of the particular new esters according to the present invention are obtained in the form of crystalline substances with a sharp melting point and which, if necessary, can readily be further purified by recrystallization from conventional solvents, whereas some of the instant esters are viscous oils which cannot be distilled.

The particular compounds of the present invention are characterized by outstanding biocidal properties. While having only a slight toxicity toward warm-blooded creatures and a low phytotoxicity, they possess excellent pesticidal, especially insecticidal and anthelimintic, activity. Besides their action against sucking and biting insects, such as aphids and caterpillars, and the like, as well as diptera, and the like, there should be especially emphasized their outstanding effectiveness against ecto- and endo-parasites on large animals, chiefly against ticks, blowflies, itch mites, and the like, as well as against gastric and intestinal worms, for example, *Haemonchus contortus*, and the like.

The particular new esters according to the present invention are, therefore, extremely suitable for use as pest control agents, especially in plant protection, and in the veterinary and hygiene fields.

Thus, the new compounds of the instant invention can be used as pesticides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance, by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.) amines (for instance, ethanolamine, etc.), amides (for instance, dimethyl formamide, etc.), sulfoxides (for instance, dimethyl sulfoxide, etc.), ketones (for instance acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves, as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes and granulates which are thus ready for use.

As concerns commercially marketed preparations these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001 and 20%, preferably 0.001 and 10%, by weight of the mixture. Thus, the present invention contemplates overall compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.0001 and 95% by weight of the mixture.

Furthermore, the present invention contemplates methods of selectively controlling or combatting pests, e.g., insects and the like, which comprise applying to at least one of (a) such pests and (b) their habitat, a pesticidally effective amount of the particular active compound of the invention alone or together with a carrier vehicle, as noted above. The instant formulations or compositions are applied in the usual manner, for example, by spraying, atomizing, vaporizing, scattering, dusting, watering, sprinkling, fumigating and the like.

The following examples are given for the purpose of illustrating, while not limiting, the utility of the particular new compounds according to the present invention.

The outstanding biological properties of the particular new products according to the present invention when used against various types of animal pests, is evident from the following experimental results:

EXAMPLE 1

Examination of the effectiveness against ticks

To produce a suitable preparation of the particular active compound, one part by weight of such active substance is mixed with 3 parts by weight acetone or dimethyl formamide, as desired, as auxiliary solvent. To this premixture, one part by weight of a commercial non-ionic emulsifier, based on aryloxy-polyglycol ether, is admixed, and this concentrate is diluted with water to the desired concentration.

Ten female ticks of the species Boöphilus microplus are placed on a small cotton wool pad which is subsequently dipped into the preparation of the given active compound prepared as described above, removed from the solution after one minute and placed in a glass dish with filter paper. The ticks are then removed from the cotton wool pad and placed on dry filter paper.

Evaluation of the test is carried out after 72 hours by determination of the degree of destruction percentagewise. 100% indicates that all ticks are killed and 0% indicates that none is killed.

The active compounds used, their concentration and the test results can be seen from Table 1 which follows:

TABLE 1

| Active compound (Constitution) | Concentration of active compound as percent | Degree of destruction as percent after 72 hours |
|---|---|---|
| (III) [structure: CH₃ substituted pyrazolopyrimidine with –O–P(OC₂H₅)₂ and S] | 0.005 | 100 |
| (IV) [structure: CH₃ substituted pyrazolopyrimidine with –O–P(=S)(OC₂H₅)(C₂H₅)] | 0.005<br>0.0025 | 100<br>80 |

EXAMPLE 2

Examination of the effectiveness against blowflies

About 20 blowfly larvae (Chrysomya chloropyga) are placed into a small glass vessel which contains 1 to 2 g. meat, as well as about 1.2 ml. of the preparation of the given active compound prepared in the manner described in Example 1 above. After 48 hours, the degree of destruction is determined; 100% indicates that all larvae are killed and 0% indicates that no larvae are destroyed.

The compounds used, their concentration and the test results can be seen from Table 2 as follows:

TABLE 2

| Active compound (constitution) | Concentration of active compound in p.p.m. | Degree of destruction as percent after 48 hours |
|---|---|---|
| (V) $CH_3$-pyrazolopyrimidine-O-P(O)(OC$_2$H$_5$)$_2$ | 3<br>1 | 100<br>50 |
| (VI) $CH_3$-pyrazolopyrimidine(Br)-O-P(S)(OC$_2$H$_5$)$_2$ | 3 | 100 |

EXAMPLE 3

Examination of the effectiveness against caterpillars

Cabbage leaves (*Brassica oleracea*) are sprayed with the preparation of the given active compound produced in the manner described in Example 1 above until dew moist, and each is infested with 10 caterpillars of the diamond-back moth (*Plutella maculipennis*).

After 48 hours, respectively, evaluation is carried out by determining the degree of destruction percentagewise. 100% indicates that all the caterpillars are killed, whereas 0% indicates that none is killed.

The active compound tested, its concentrations, and the results obtained can be seen from the following Table 3:

TABLE 3

| Active compound (constitution) | Concentration of active compound as percent | Degree of destruction as percent after 48 hours |
|---|---|---|
| (V') $CH_3$-pyrazolopyrimidine-O-P(O)(OC$_2$H$_5$)$_2$ | 0.01<br>0.001 | 100<br>75 |

EXAMPLE 4

Examination of the effectiveness against aphids (contact-insecticidal action)

Bush bean plants (*Vicia faba*), which have been strongly infested with the black bean aphid (*Doralis fabae*), are sprayed with the preparation of the given active compound produced in the manner described in Example 1 above, until they are dripping wet.

Evaluation of the test is carried out after 48 hours by counting the dead pests which are present on the soil surface or still on the plants. The degree of destruction is given percentagewise. 100% indicates that all the aphids are killed, whereas 0% indicates that none is killed.

The tested active compounds, their concentration and the degree of destruction can be seen from Table 4 as follows:

TABLE 4

| Active compound (constitution) | Concentration of active compound as percent | Degree of destruction as percent after 48 hours |
|---|---|---|
| (IV') $CH_3$-pyrazolopyrimidine-O-P(S)(OC$_2$H$_5$)(C$_2$H$_5$) | 0.001 | 100 |
| (III') $CH_3$-pyrazolopyrimidine-O-P(S)(OC$_2$H$_5$)$_2$ | 0.001<br>0.0001 | 100<br>40 |

The following examples are given for the purpose of illustrating the production process for the particular compounds of the present invention:

EXAMPLE 5

$CH_3$-pyrazolopyrimidine-O-P(S)(OC$_2$H$_5$)$_2$ (III'')

32.6 grams (0.2 mol) of 2 - hydroxy - 5,7 - dimethyl-pyrazolo - (1,5 - a) - pyrimidine and 20.2 g. of triethyl-amine are dissolved in 250 cc. of acetonitrile. To this solution there are added dropwise at 25 to 30° C., 38 g. of O,O - diethyl - thionophosphoric acid chloride. The reaction mixture is subsequently heated at about 50 to 60° C. for a further hour and then cooled to room temperature. The reaction mixture is poured into water, the precipitated oil taken up in methylene chloride, the methylene chloride solution dried over anhydrous sodium sulfate and the solvent distilled off. The residue immediately solidifies in crystalline form and can be recrystalized from a benzene/ligroin mixture. The yield is 50 g. (79.5% of theory) of O - [5,7 - dimethyl-pyrazolo - (1,5 - a) - pyrimid - 2 - yl] - O,O-diethylthionophosphoric acid ester or 2 - (O,O - diethyl-thionophosphoryltrioxy) - 5,7 - dimethyl - pyrazolo-(1,5 - a) - pyrimidine. After recrystallization, the melting point of this compound, which has the above formula, is 42 to 43° C.

EXAMPLE 6

$CH_3$-pyrazolopyrimidine-O-P(O)(OC$_2$H$_5$)$_2$ (V'')

32 grams (0.2 mol) of 2 - hydroxy - 5,7 - dimethyl-pyrazolo - (1,5 - a) - pyrimidine and 20.2 g. of triethyl-amine are dissolved in 300 cc. of benzene. To this solution there are added dropwise at 40 to 50° C., 34.5 g. of O,O - diethyl - phosphoric acid chloride. The reaction mixture is subsequently heated at boiling temperature for a further hour, then cooled to about 5° C., and the precipitate formed filtered off with suction.

The filtrate is evaporated under reduced pressure and liberated from volatile components at 1 mm. Hg and 50° C. The yield is 58 g. (97% of theory) of O-[5,7-dimethyl - pyrazolo - (1,5 - a) - pyrimid - 2 - yl] - O,O-diethyl phosphoric acid ester or 2 - (O,O - diethyl - phosphoryl - trioxy) - 5,7 - dimethyl - pyrazolo - (1,5 - a)-pyrimidine.

*Analysis.*—Calculated for molecular weight 299: P, 10.38%; N, 14.03%. Found: P, 10.83%; N, 13.81%.

EXAMPLE 7

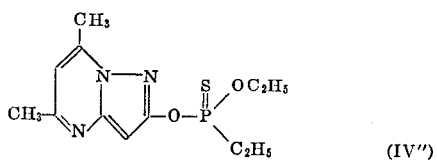

(IV''')

34.5 grams of ethyl - O - ethyl - thionophosphonic acid chloride are added dropwise at 30 to 40° C. to a solution of 32.6 g. (0.2 mol) of 2 - hydroxy - 5,7-dimethyl - pyrazolo - (1,5 - a) - pyrimidine and 20.2 g. of triethylamine in 300 cc. of benzene. The mixture then is heated at boiling temperature for one hour, and the reaction mixture subsequently cooled at 20° C. and washed twice with water. The organic phase is then dried and the benzene distilled off. The residue is liberated from all volatile components at a pressure of 1 mm. Hg and at a bath temperature of 50° C. There are thus obtained 52.8 g. (88.5% of theory) of the compound O - [5,7-dimethyl - pyrazolo - (1,5 - a) - pyrimid 2 - yl] - ethyl-O - ethyl - thionophosphonic acid ester or 2 - (ethyl-O-ethylthionophosphonyl - dioxy) - 5,7 - dimethyl pyrazolo - (1,5 - a) - pyrimidine, having the above constitution.

*Analysis.*—Calculated for molecular weight 299: P, 10.38%; S, 10.70%; N, 14.03%. Found: P, 10.96%; S, 10.90%; N, 13.82%.

EXAMPLE 8

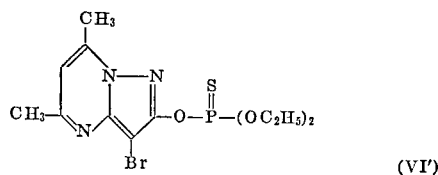

(VI')

A solution of 36.3 g. (0.15 mol) of 2-hydroxy-3-bromo-5,7-dimethyl-pyrazolo-(1,5-a)-pyrimidine and 16 g. of triethylamine in 300 cc. of acetonitrile is mixed dropwise at 25 to 30° C. with 28.3 g. of O,O-diethyl-thionophosphoric acid chloride. The reaction mixture is subsequently stirred for a further hour at 25° C. and then for another hour at 50° C. The reaction mixture is then cooled to 20° C. and poured into water. The precipitated oil solidifies immediately in crystalline form. The crystals are filtered off with suction, dried and recrystallized from ligroin. The yield is 46 g. (77.8% of theory) of O-[3-bromo-5,7-dimethyl-pyrazolo - (1,5-a)-pyrimid-2-yl]-O,O-diethylthionophosphoric acid ester or 2-(O,O-diethyl-thionophosphoryltrioxy)-3-bromo - 5,7 - dimethyl-pyrazolo-(1,5-a)-pyrimidine. The recrystallized product melts at 95° C.

*Analysis.*—Calculated for molecular weight: P, 7.86%; S, 8.12%; N, 10.66%; Br, 20.3%. Found: P, 8.08%; S, 8.23%; N, 10.29%, Br, 19.95%.

The following compounds can be prepared in an analogous manner:

Constitution

O - [5,7 - dimethyl-pyrazolo-(1,5-a)-pyrimid - 2 - yl]-phenyl-O-ethyl-thionophosphonic acid ester or 2-(phenyl-O-ethyl-thionophosphonyl-dioxy)-5,7 - dimethyl-pyrazolo-(1,5-a)-pyrimidine (M.P. 80–82° C.).

(VII)

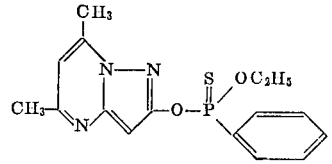

O-[3-bromo - 5,7 - dimethyl-pyrazolo-(1,5-a)-pyrimid-2-yl]-phenyl-O-ethyl-thionophosphonic acid ester or 2-(phenyl-O-ethyl-thionophosphonyl - dioxy)-3-bromo-5,7-dimethyl-pyrazolo-(1,5-a)-pyrimidine (M.P. 112° C.).

(VIII)

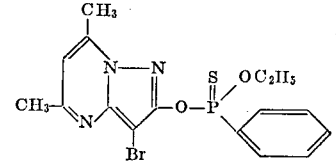

O-[3-bromo-5,7-dimethyl - pyrazolo-(1,5-a)-pyrimid-2-yl]-phenyl-O-methyl-thionophosphonic acid ester or 2-(phenyl-O-methylthionophosphonyl - dioxy)-3-bromo-5,7-dimethylpyrazolo - (1,5-a) - pyrimidine (M.P. 124–125° C.).

(IX)

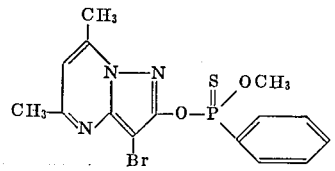

O-[3-bromo-5,7-dimethyl - pyrazolo-(1,5-a)-pyrimid-2-yl]-O,O-diethyl-phosphoric acid ester or 2-(O,O-diethyl-phosphoryl - trioxy)-3-bromo-5,7-dimethyl-pyrazolo-(1,5-a)-pyrimidine (M.P. 55–56° C.).

(X)

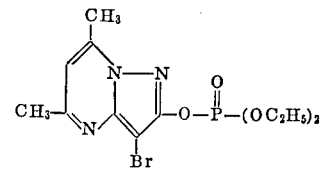

In an analogous manner, using corresponding molar amounts of 2-hydroxy-3-chloro-5-isopropyl-pyrazolo-(1,5-a)-pyrimidine and O-ethyl-O-isopropyl-phosphoric acid chlorine, O-[3-chloro-5-isopropyl-pyrazolo-(1,5-a)-pyrimid-2-yl]-O-ethyl-O-isopropyl-phosphoric acid ester is produced. Also using corresponding molar amounts of 2-hydroxy-7-ethyl-pyrazolo-(1,5-a)-pyrimidine and O-n-butyl-O-tert.-butyl-thionophosphoric acid chloride, O-[7-ethyl - pyrazolo - (1,5-a)-pyrimid-2-yl]-O-n-butyl-O-tert.-butyl-thionophosphoric acid ester is produced.

Advantageously, in accordance with the present invention, in the foregoing formulae:

R and R′ each respectively represents hydrogen or alkyl having 1 to 3 carbon atoms such as methyl, ethyl, n-propyl and isopropyl;

R″ and R‴ each respectively represents alkyl such as methyl, ethyl, n-propyl, isopropyl, n-butyl, isobutyl, sec.-butyl, tert.-butyl, and the like, and especially lower alkyl, and most especially lower alkyl having 1 to 4 carbon atoms; alkoxy, such as methoxy, ethoxy, n-propoxy, isopropoxy, n-butoxy, isobutoxy, sec.-butoxy, tert.-butoxy, and the like, and especially lower alkoxy, and most especially lower alkoxy having 1 to 4 carbon atoms; and phenyl;

X represents hydrogen or halogen, such as chloro, bromo, iodo, and fluoro, and especially chloro or bromo; and Y represents oxygen or sulfur.

All of the foregoing compounds in accordance with the present invention possess the desired high pesticidal, and especially insecticidal, effectiveness while similarly possessing comparatively low phytotoxicity as regards cultivated plants especially, and comparatively low toxicity towards warm-blooded creatures. All of such compounds may be used as pesticides, with the concentration utilized being dependent upon the particular situation, as the artisan will appreciate.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. O-pyrazolo-(1,5-a)-pyrimidyl-phosphorus acid esters having the general formula

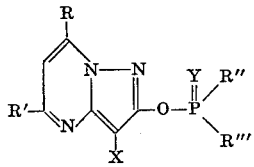

in which R and R' each respectively is selected from the group consisting of hydrogen and alkyl having 1 to 3 carbon atoms, R" and R''' each respectively is selected from the group consisting of lower alkyl, lower alkoxy and phenyl, X is selected from the group consisting of hydrogen and halogen, and Y is selected from the group consisting of oxygen and sulfur.

2. Esters according to claim 1 wherein R" and R''' each respectively is selected from the group consisting of alkyl having 1 to 4 carbon atoms, alkoxy having 1 to 4 carbon atoms, and phenyl.

3. Ester according to claim 1 wherein such compound is O-[5,7-dimethyl-pyrazolo-(1,5-a)-pyrimid-2-yl]-O,O-diethylthionophosphoric acid ester having the formula

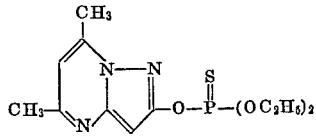

4. Ester according to claim 1 wherein such compound is O-[5,7-dimethyl-pyrazolo-(1,5-a)-pyrimid-2-yl]-ethyl-O-ethyl-thionophosphonic acid ester having the formula

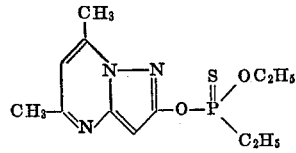

5. Ester according to claim 1 wherein such compound is O-[5,7 - dimethyl-pyrazolo-(1,5-a)-pyrimid-2-yl]-O,O-diethyl-phosphoric acid ester having the formula

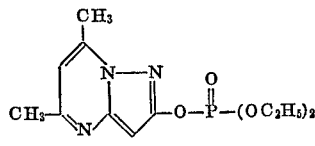

6. Ester according to claim 1 wherein such compound is O-[3-bromo-5,7-dimethyl-pyrazolo-(1,5-a)-pyrimid-2-yl]-O,O-diethyl-thionophosphoric acid ester having the formula

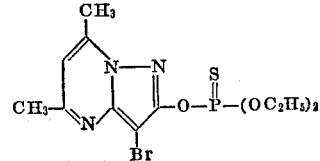

7. Ester according to claim 1 wherein such compound is O-[5,7-dimethyl-pyrazolo-(1,5-a)pyrimid-2-yl]-phenyl-O-ethyl-thionophosphonic acid ester having the formula

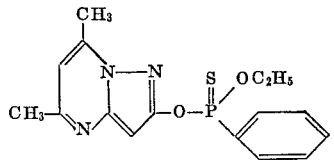

8. Ester according to claim 1 wherein such compound is O-[3-bromo-5,7-dimethyl-pyrazolo-(1,5-a)-pyrimid-2-yl]-phenyl-O-ethyl-thionophosphonic acid ester having the formula

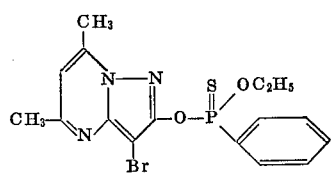

9. Ester according to claim 1 wherein such compound is O-[3-bromo-5,7-dimethyl-pyrazolo-(1,5-a)-pyrimid-2-yl]-phenyl-O-methyl-thionophosphonic acid ester having the formula

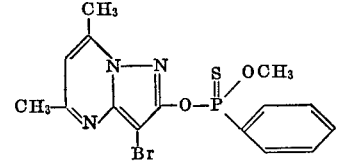

10. Ester according to claim 1 wherein such compound is O-[3-bromo-5,7-dimethyl-pyrazolo-(1,5-a)-pyrimid-2-yl]-O,O-diethyl-phosphoric acid ester having the formula

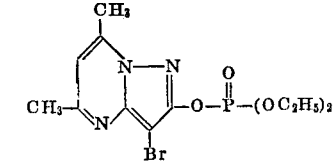

References Cited

FOREIGN PATENTS 713,278   8/1954   Great Britain.

NICHOLAS S. RIZZO, *Primary Examiner.*

R. J. GALLAGHER, *Assistant Examiner.*